US012466710B2

(12) United States Patent
Wen et al.

(10) Patent No.: US 12,466,710 B2
(45) Date of Patent: Nov. 11, 2025

(54) LOCKING MECHANISM AND ROTATING LIFTING PLATFORM EMPLOYING MECHANISM

(71) Applicants: Futaijing Precision Electronics (Yantai) Co., Ltd., Yantai (CN); HON HAI PRECISION INDUSTRY CO., LTD., New Taipei (TW)

(72) Inventors: Chi-Cheng Wen, New Taipei (TW); Yu-Sheng Chang, New Taipei (TW); Chih-Cheng Lee, New Taipei (TW); Chiung-Hsiang Wu, New Taipei (TW); Chang-Ju Hsieh, New Taipei (TW); Yu-Cheng Zhang, New Taipei (TW); Sheng-Li Yen, New Taipei (TW); Chen Chao, New Taipei (TW); Chen-Ting Kao, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 373 days.

(21) Appl. No.: 18/114,102

(22) Filed: Feb. 24, 2023

(65) Prior Publication Data

US 2023/0331526 A1 Oct. 19, 2023

(30) Foreign Application Priority Data

Apr. 13, 2022 (CN) ......................... 202220855714.0

(51) Int. Cl.
*B66F 7/28* (2006.01)
*B66F 7/12* (2006.01)

(52) U.S. Cl.
CPC . *B66F 7/28* (2013.01); *B66F 7/12* (2013.01)

(58) Field of Classification Search
CPC .......... B66F 2700/04; B66F 3/08; B66F 3/16; B66F 3/18; B66F 3/20; B66F 3/44; B66F 7/14; B66F 7/18; B66F 7/28
See application file for complete search history.

(56) References Cited

U.S. PATENT DOCUMENTS

2002/0195593 A1* 12/2002 Ardrey, Jr. ................ B66F 3/46 254/100
2015/0076432 A1* 3/2015 Farquharson ............. B66F 3/24 254/93 A

* cited by examiner

*Primary Examiner* — Tyrone V Hall, Jr.
(74) *Attorney, Agent, or Firm* — ScienBiziP, P.C.

(57) ABSTRACT

A locking mechanism comprises a main body, an ejector rod, a guide rod assembly, a carrier plate and a fixing assembly. The carrier plate comprises a center hole and a plurality of annular strip holes. The fixing assembly comprises a rotary disc. The center hole and the annular strip holes can lock the rotary disc in different rotation angles. The guide rod assembly limits the rotation tolerance of the carrier plate, and makes the carrier plate move up and down in the vertical direction. The rotary disc with limited rotational freedom is fixedly connected with the ejector rod, so that the locking mechanism can not only realize the linear lifting motion of the ejector rod, but also reduce the rotation angle error between the carrier plate and the ejector rod. A rotating lifting platform is also provided.

10 Claims, 3 Drawing Sheets

LOCKING MECHANISM AND ROTATING LIFTING PLATFORM EMPLOYING MECHANISM

TECHNICAL FIELD

The subject matter herein generally relates to machinery equipment.

BACKGROUND

The existing rotary lifting equipment uses swivel feeding to move the object. And the rotary lifting platform carries out lifting motion while rotating, so as to lift the object placed on the rotary lifting platform.

The components of the existing rotary lifting platform will generate angle tolerance during the rotation process, which will cause the rotary lifting platform become not in situ after rotation reset. Therefore, a mechanism is needed to realize the linear lifting movement of the rotary lifting platform and reduce the rotation angle error of the rotary lifting platform. How to solve the above problems is the technical personnel in this field need to consider.

BRIEF DESCRIPTION OF THE DRAWINGS

Implementations of the present technology will now be described, by way of example only, with reference to the attached figures.

DETAILED DESCRIPTION

Figure 1:
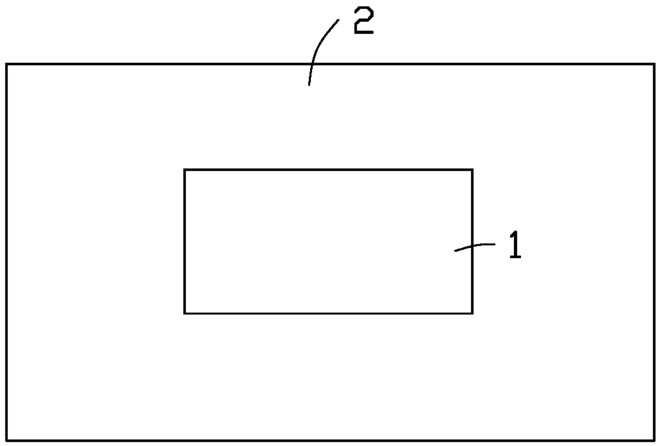
FIG. 1 is an exploded diagram of a locking mechanism in one embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 is a diagram of explosion of a locking mechanism 1 in one embodiment of the present application. The locking mechanism 1 can be set in a rotating lifting platform 2 and configured to lock the rotating lifting platform 2 at different rotation angles.

Figure 2:
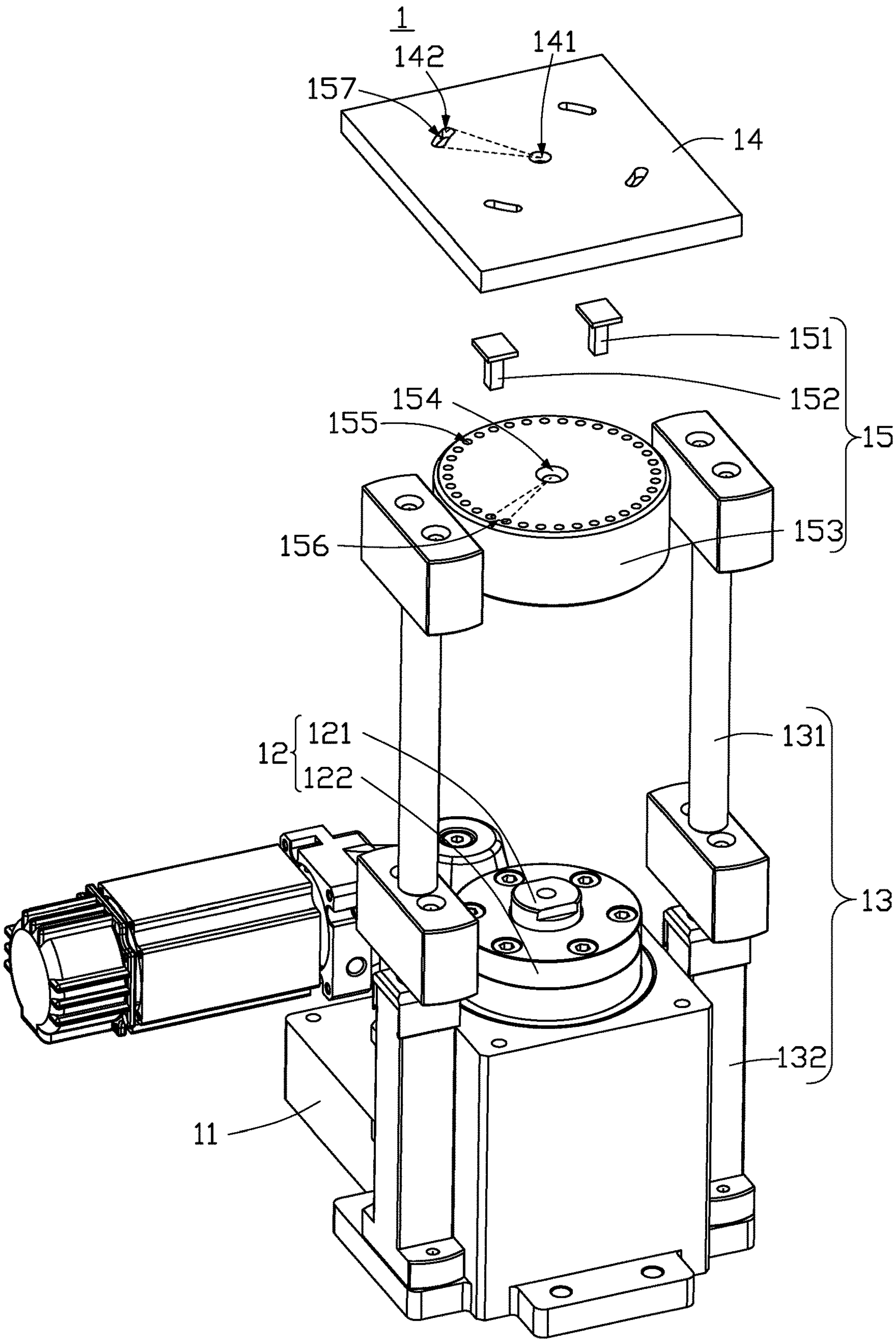
FIG. 2 is an exploded diagram of a locking mechanism.

FIG. 2 is a diagram of explosion of the locking mechanism.

The locking mechanism 1 comprises a main body 11, a ejector rod 12 movably connected to the main body 11, a guide rod assembly 13 fixedly connected to the main body 11, a carrier plate 14 fixedly connected to the guide rod assembly 13 and a fixing assembly 15. The carrier plate 14 comprises a center hole 141 and a plurality of annular strip holes 142. The plurality of annular strip holes 142 are distributed on a circumference with the center hole 141 as a center of the circle. The fixing assembly 15 comprises the first connecting piece 151, the second connecting piece 152 and the rotary disc 153. The rotary disc 153 comprises a fixing hole 154 and a positioning hole 155. The fixing hole 154 is interconnected with the center hole 141 and is fixed with the center hole 141 through the first connecting piece 151. The annular strip hole 142 is interconnected with the positioning hole 155 and is fixed with the positioning hole 155 through the second connecting piece 152. The fixing assembly 15 is fixedly connected with the ejector rod 12. The fixing assembly 15 is used to reduce the rotation motion error caused by the ejector rod 12.

In one embodiment, the second connecting piece is a bolt. The bolt is fixedly connected with the surface of the positioning hole 155, and the bolt rests on a surface of the annular strip hole 142.

Further, the guide rod assembly 13 fixes the carrier plate 14, the carrier plate 14 is positioned with the rotary disc 153 through the center hole 141 and connected with the rotary disc 153 through the first connecting piece 151. The carrier plate 14 adjusts the angular position between the annular strip holes 142 and the positioning holes 155, and is fixedly connected with the rotary disc 153 through the second connecting piece 152. The carrier plate 14 and the rotary disc 153 are locked by the first connecting piece 151 and the second connecting piece 152. According to the different rotation angles of the rotary disc 153, the second connecting piece 152 can slide to the corresponding position of the positioning hole 155 in the annular strip holes 142. The second connecting piece 152 rests on a surface of the annular strip hole 142, to realize the locking of the carrier plate 14 and the rotary disc 153 at different angles. The carrier plate 14 is used to fix the rotary disc 153 so as to limit the rotation angle of the rotary disc 153, so as to reduce the rotation angle error between the carrier plate 14 and the ejector rod 12.

In one embodiment, multiple positioning holes 155 are uniformly distributed on the carrier plate 14 with the fixing hole 154 as the center of the circle.

In one embodiment, an arc length 156 of a first arc formed by two adjacent positioning holes 155 is A, and a second arc length 157 formed by the annular strip hole 142 is B, which satisfies a condition of B=n*A, n is a positive integer.

In one embodiment, the carrier plate 14 comprises at least two annular strip holes 142, and the at least two annular strip holes 142 are uniformly distributed on the carrier plate 14 with the center hole as the first center of the first circle.

In one embodiment, at least two second connecting pieces 152 are set in at least two annular strip holes 142 and the positioning hole 155, and the second connecting pieces 152 are set evenly with the first connecting pieces 151 as a second center of a second circle.

In this embodiment, the locking mechanism 1 can be driven by a motor. The locking mechanism 1 comprises the main body 11 and the ejector rod 12 connected with the main body 11. The main body 11 can adopt the existing rotary lift. The main body 11 is equipped with a transmission mechanism, and the ejector rod 12 can rotate and lift at the same time through the transmission mechanism. Externally to the main body 11 are provided the guide rod assembly 13, the carrier plate 14 and the fixing assembly 15. The guide rod assembly 13 is a lifting guide rail device with linear freedom of movement. The guide rod assembly 13 is arranged on both sides of the main body 11. The base of guide rod assembly 13 and the base of the main body 11 are fixed and connected by screws or welding.

The other end of the base of the guide rod assembly 13 is movable, and the carrier plate 14 is fixed and connected with the movable end of the guide rod assembly 13 by means of screws. Thus, the guide rod assembly 13 connects the carrier plate 14 to the main body 11. The ejector rod 12 rotates and lifts under the drive of the main body 11. The ejector rod 12 lifts the carrier plate 14 in the lifting process. The guide rod assembly 13 is used to assist the lift of the carrier plate 14 and the ejector rod 12 at the same time. The guide rod assembly 13 is also configured to withstand the rotational torsion force exerted by the ejector rod 12 on the carrier plate 14.

The fixing assembly 15 is set at the connection between the carrier plate 14 and the ejector rod 12, the fixing assembly 15 is configured to adjust the rotation angle and reduce the rotation angle error between the carrier plate 14 and the ejector rod 12. The plurality of annular strip holes 142 are distributed on the carrier plate with the center hole 141 as the center of the circle. The first connecting piece 151 can be a screw, the second connecting piece 152 can be a bolt, the rotary disc 153 is a cylindrical shape, and the rotary disc 153 is fixedly connected with the ejector rod 12 and rotates coaxial. The rotary disc 153 comprises a fixed hole 154 and a positioning hole 155, the fixed hole 154 is interconnected with the center hole 141 and fixed with the center hole 141 through the first connecting piece 151, the annular strip hole 142 is interconnected with the positioning hole 155 and fixed with the positioning hole through the second connecting piece 152. The latch is fixedly connected with the surface of the positioning hole 155, and has a contactable connection with the surface of the annular strip hole 142.

In this way, the annular strip hole 142 is connected with the positioning hole 155 to form a connected hole, and the latch is placed in the connected hole for that the carrier plate 14 and the rotary disc 153 can be connected and locked at any rotation angle.

The plurality of positioning holes 155 are uniformly distributed on the circumference with the fixed hole 154 as the center of the circle. Two adjacent positioning holes 155 form the first arc length 156 as A, and annular strip hole 142 forms the second arc length 157 as B, which satisfies the condition B=n*A, n is a positive integer. That is, the hole profile of annular strip hole 142 can contain multiple hole profiles of positioning hole 155, to be configured to realize that the annular strip hole 142 can be connected with at least one positioning hole 155 at any rotation angle of the rotary disc 153, so that the carrier plate 14 and the rotary disc 153 can be connected and locked at any rotation angle. At least two annular strip holes 142 are set, and the annular strip holes 142 are set evenly with the center hole 141 as the center of the circle, so that the locking positions can be evenly distributed. At least two second connecting pieces 152 are set in the at least two annular strip holes 142 and the positioning hole 155. The second connecting pieces 152 are set evenly with the first connecting piece 151 as the center of the circle, so that the first connecting piece 151 and the second connecting piece 152 can lock the carrier plate 14 and the rotary disc 153. One second connecting piece 152 holds one end of the annular strip hole 142 to limit the forward rotation of the rotary disc 153, and another second connecting piece 152 holds the other end of the annular strip hole 142 to limit the reverse rotation of the rotary disc 153 to enable the carrier plate 14 to fix the rotary disc 153 so as to limit the rotation angle of the rotary disc 153.

In one embodiment, the guide rod assembly 13 comprises a telescopic rod 131, the telescopic rod is arranged on both sides of the body 11, the telescopic rod 131 is retractable connected with the carrier plate 14, the ejector rod 12 is arranged in the middle of the main body 11, the ejector rod 12 is fixedly connected to a surface of the fixed hole 154, and the ejector rod 12 is configured to lift the carrier plate 14.

In one embodiment, the guide rod assembly 13 further comprises a guide sleeve 132, the guide sleeve 132 is connected to the telescopic rod 131 and outside the telescopic rod 131, and the guide sleeve 132 is fixedly connected with the main body 11.

In one embodiment, the guide sleeve 132 is provided with a straight hollow cavity, and the telescopic rod 131 is movable in the hollow cavity.

In this embodiment, the guide rod assembly 13 is a lifting guide rail device with linear freedom of movement, and the guide rod assembly 13 includes a telescopic rod 131 and a guide sleeve 132. The guide sleeve 132 is provided with a straight hollow cavity, guide sleeve 132 is connected with the telescopic rod 131, the telescopic rod 131 can be arranged in the hollow cavity. The telescopic rod 131 can rise and fall linearly in the guide sleeve 132, the telescopic rod 131 is arranged on both sides of the main body 11 and is telescopically connected with the carrier plate 14 telescopic, so that the telescopic rod 131 can move up and down with the ejector rod 12. The guide sleeve 132 is fixedly connected to the main body 11 to limit the rotation of the carrier plate 14. The ejector rod 12 is arranged in the middle of the main body 11, and the ejector rod 12 is fixedly connected with the surface of the fixed hole 154 for lifting the carrier plate 14.

Figure 3:
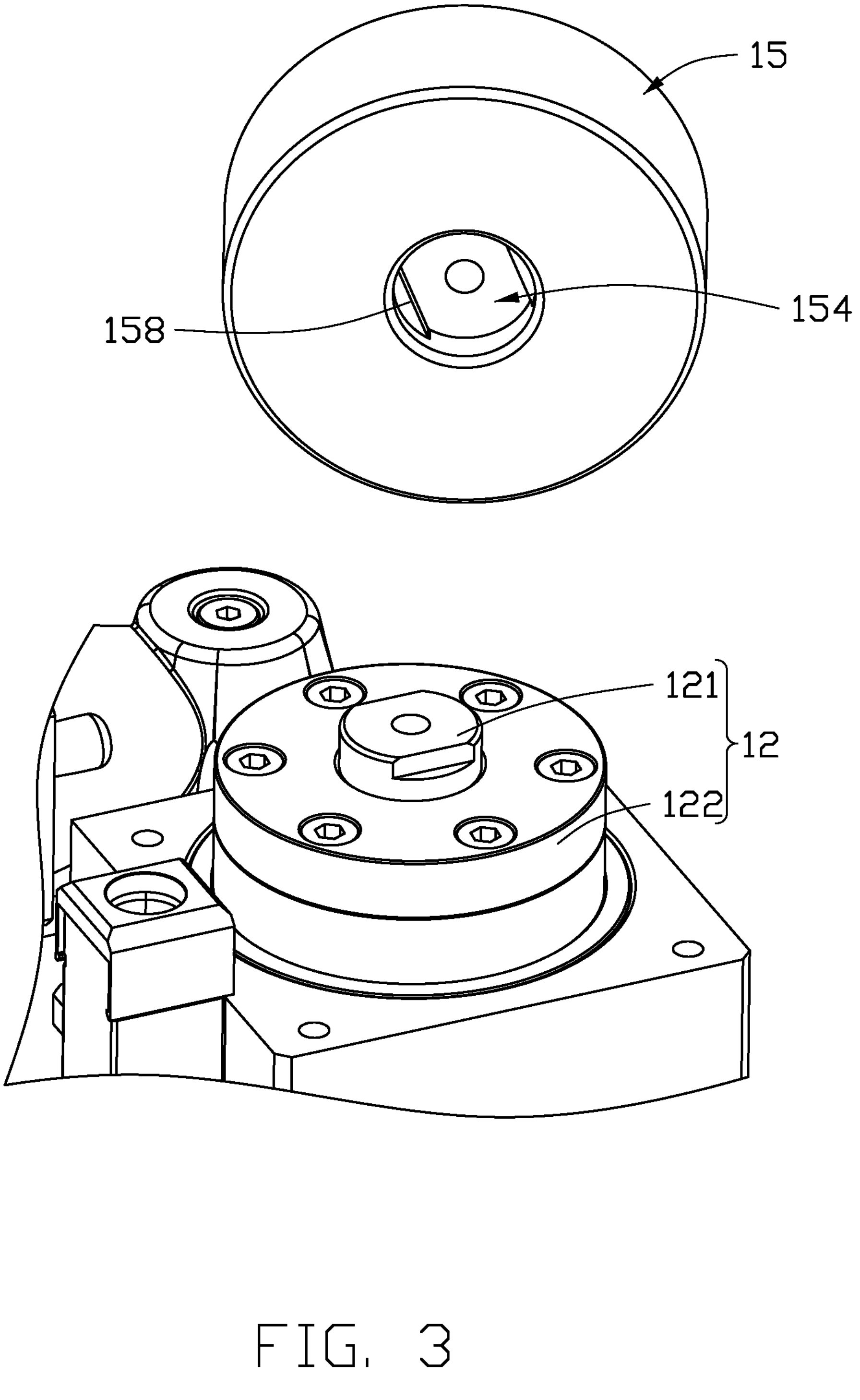
FIG. 3 is a partial stereoscopic diagram of the locking mechanism shown in FIG. 2.

FIG. 3 is a partial stereoscopic diagram of the locking mechanism shown in FIG. 2.

In one embodiment, the ejector rod 12 comprises a clamping club 121 and a stabilizing plate 122, the clamping club 121 is movably set in the middle of the stabilizing plate 122, and one end of the fixing assembly 15 away from the carrier plate 14 comprises a clamping slot 158, the clamping slot 158 and the fixing hole 154 are arranged in a coaxial manner with the fixing hole 154. The clamping club 121 and a surface of the clamping slot 158 are mutually compatible and fixedly connected.

In this embodiment, one end of the fixing assembly 15 comprises a fixing hole 154 and a positioning hole 155, the fixing assembly 15 is fixedly connected with the carrier plate 14 through the first connecting piece 151 and the second connecting piece 152. And the other end of the fixing assembly 15 is fixedly connected with the ejector rod 12.

The ejector rod 12 controls the carrier plate 14 moves up and down through the fixing assembly 15, and at the same time the carrier plate 14 reduces the rotation angle error between the carrier plate 14 and the ejector rod 12 through the fixing assembly 15. The clamping slot 158 is arranged at one end of the fixing assembly 15 away from the carrier plate 14. The clamping slot 158 is arranged in a coaxial manner with the fixing hole 154. A surface of clamping slot 158 is connected with the ejector rod 12 to locate and fix the ejector rod 12 and the fixing assembly 15.

The ejecting rod 12 comprises a clamping club 121 and a stabilizing plate 122, the clamping club 121 and the stabilizing plate 122 are connected with the transmission mechanism inside the main body 11. Driving by the main body 11, the clamping club 121 rotates and moves up and down relative to the stabilizing plate 122. The clamping club 121 is moveable in the middle of the stabilizing plate 122.

The clamping club 121 can be a cylindrical pin, the top of the pin is provided with a groove for clamping club 121 and the surface of the clamping slot 158 mutually fit and fixedly connected, to reduce the rotation error between the fixed component 15 and the ejector 12.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A rotating lifting platform, comprising:

a main body;

an ejector rod movably connected to the main body;

a guide rod assembly fixedly connected to the main body;

a carrier plate fixedly connected to the guide rod assembly, wherein the carrier plate comprises a center hole and a plurality of annular strip holes, the plurality of annular strip holes are distributed on a circumference with the center hole as a first center of a first circle; and a fixing assembly comprising a first connecting piece, a second connecting piece, and a rotary disc, wherein the rotary disc comprises a fixing hole and a positioning hole, the fixing hole is interconnected with the center hole and is fixed with the center hole through the first connecting piece, the annular strip hole is interconnected with the positioning hole and is fixed with the positioning hole through the second connecting piece, the fixing assembly is fixedly connected to the ejector rod, the fixing assembly is configured to reduce a rotation error caused by the ejector rod.

2. The rotating lifting platform of claim 1, wherein the second connecting piece is a bolt, the bolt is fixedly connected with a surface of the positioning hole, and the bolt rests on a surface of the annular strip hole.

3. The rotating lifting platform of claim 1, wherein multiple positioning holes are uniformly distributed on the circumference with the fixing hole as the first center of the first circle.

4. The rotating lifting platform of claim 3, wherein an arc length of a first arc formed by two adjacent positioning holes is A, and a second arc length of the annular strip hole is B, which satisfies a condition of B=n*A, n is a positive integer.

5. The rotating lifting platform of claim 1, wherein the carrier plate comprises at least two annular strip holes, and the at least two annular strip holes are uniformly distributed on the carrier plate with the center hole as the first center of the first circle.

6. The rotating lifting platform of claim 5, wherein at least two second connecting pieces are set in the at least two annular strip holes and the positioning hole, and the second connecting pieces are set evenly with the first connecting pieces as a second center of a second circle.

7. The rotating lifting platform 1, wherein the guide rod assembly comprises a telescopic rod, the telescopic rod is arranged on both sides of the main body, the telescopic rod is retractably connected with the carrier plate, the ejector rod is arranged in the middle of the main body and is fixedly connected to a surface of the fixing hole, the ejector rod is configured to lift the carrier plate.

8. The rotating lifting platform of claim 7, wherein the ejector rod comprises a clamping club and a stabilizing plate, the clamping club is movably set in a middle of the stabilizing plate, and one end of the fixing assembly away from the carrier plate comprises a clamping slot, the clamping slot and the fixing hole are arranged in a coaxial, the clamping club and a surface of the clamping slot are mutually compatible and fixedly connected.

9. The rotating lifting platform of claim 7, wherein the guide rod assembly further comprises a guide sleeve, the guide sleeve is connected to the telescopic rod and outside the telescopic rod, and the guide sleeve is further fixedly connected with the main body.

10. The rotating lifting platform of claim 9, wherein the guide sleeve comprises a straight hollow cavity, and the telescopic rod is movably set in the straight hollow cavity.

* * * * *